(12) United States Patent
Yousefi et al.

(10) Patent No.: US 7,426,386 B1
(45) Date of Patent: Sep. 16, 2008

(54) BEAM LAYDOWN FOR HOPPED SATELLITE DOWNLINK WITH ADAPTABLE DUTY CYCLE

(75) Inventors: Esmaell Yousefi, Manhattan Beach, CA (US); Harvey L. Berger, Redondo Beach, CA (US); Dennis A. Nivens, Hermosa Beach, CA (US); Scott A. Cooper, Torrance, CA (US); Reginald Jue, Manhattan Beach, CA (US); Robert W. White, Playa del Rey, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 846 days.

(21) Appl. No.: 09/599,036

(22) Filed: Jun. 21, 2000

(51) Int. Cl.
*H04Q 7/20* (2006.01)

(52) U.S. Cl. .......... 455/429; 455/62; 455/427; 455/446; 455/450; 342/81; 342/117; 342/154; 342/354; 342/408; 375/132; 375/135; 375/138

(58) Field of Classification Search .......... 455/62, 455/63, 446, 447, 450, 451, 452.1, 75, 113, 455/427, 98, 12.1, 13.2, 12.3, 429; 370/328, 370/329, 330, 331, 336, 343, 345, 349; 375/132, 375/138, 135; 342/408, 81, 117, 154, 354
See application file for complete search history.

(56) References Cited

U.S. PATENT DOCUMENTS

| | | | |
|---|---|---|---|
| 5,689,805 A * | 11/1997 | Ayerst et al. | 370/312 |
| 5,963,165 A | 10/1999 | Das | |
| 6,061,562 A * | 5/2000 | Martin et al. | 455/431 |
| 6,272,348 B1 * | 8/2001 | Saario et al. | 455/452.1 |
| 6,275,518 B1 * | 8/2001 | Takahashi et al. | 375/135 |
| 6,359,924 B1 * | 3/2002 | Kuhn et al. | 375/132 |
| 6,459,900 B1 * | 10/2002 | Scheinert | 455/446 |
| 6,493,376 B1 * | 12/2002 | Harms et al. | 375/130 |
| 6,522,643 B1 * | 2/2003 | Jacomb-Hood et al. | 370/347 |
| 6,577,670 B1 * | 6/2003 | Roberts | 375/133 |

FOREIGN PATENT DOCUMENTS

| | | |
|---|---|---|
| EP | 0536068 | 4/1993 |
| EP | 0578075 | 1/1994 |
| WO | WO 00/21216 | 4/2000 |

* cited by examiner

*Primary Examiner*—Nghi H. Ly
(74) *Attorney, Agent, or Firm*—Tarolli, Sundheim, Covell & Tummino LLP

(57) ABSTRACT

A power gated variable hop cycle beam laydown (700) manifests itself as first cells (C, D) supported by a first hop cycle, second cells (G, H) supported by a second hop cycle, and transition cells (E, F) supported by a transition hop cycle. The transition hop cycle uses power gating to transition the laydown (700) from cells (C, D) operating at the first hop cycle to cells (G, H) operating at the second hop cycle. To this end, the transition hop cycle power gates its downlink beam for a portion of time needed to reduce interference between nearby (e.g., adjacent) cells.

6 Claims, 6 Drawing Sheets

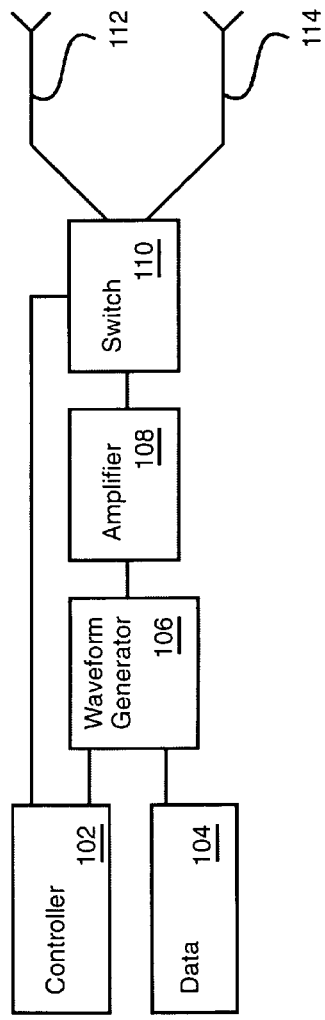
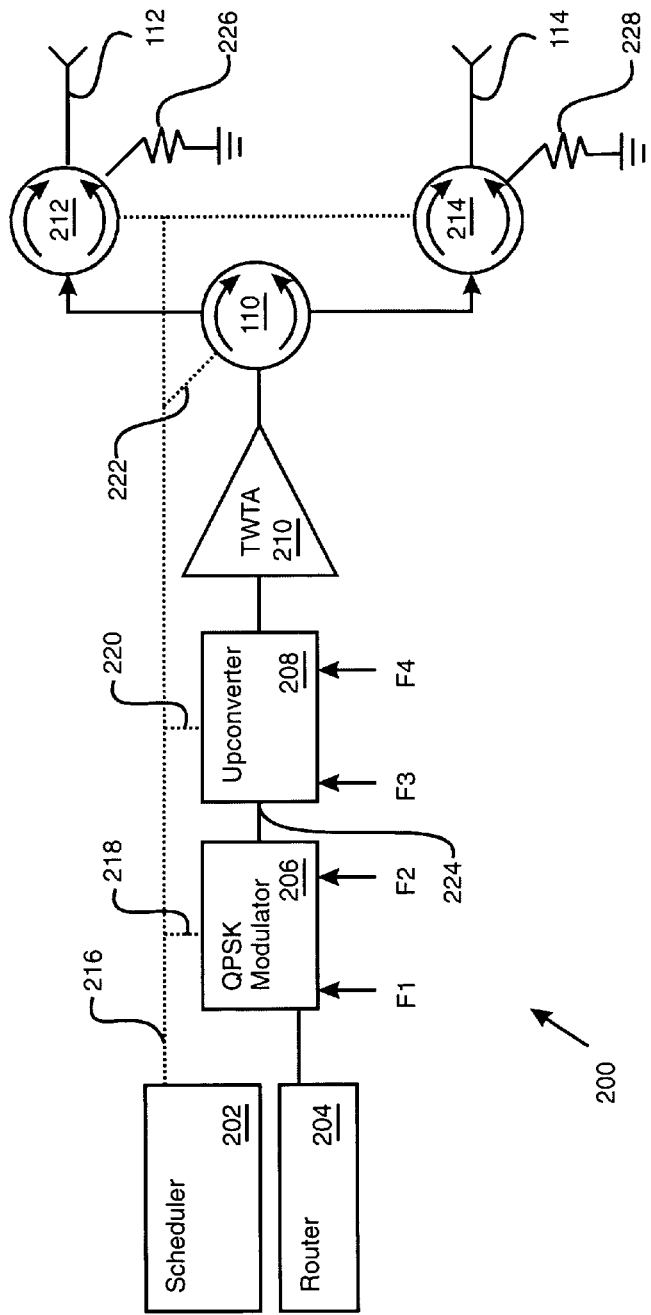
Figure 1
Figure 2

BEAM LAYDOWN FOR HOPPED SATELLITE DOWNLINK WITH ADAPTABLE DUTY CYCLE

CROSS-REFERENCE TO RELATED APPLICATIONS

This application is related to titled "Gated Power Time Division Downlink for a Processing Satellite", filed Mar. 16, 1999 as Ser. No. 09/270,361 and title "Beam Hopped Gated Power Time Division Downlink", filed Jun. 21, 2000 as Ser. No. 09/599,042.

BACKGROUND OF THE INVENTION

The present invention relates to satellite communications systems. In particular, the present invention relates to downlink beam power gating techniques particularly adapted to variable hop cycle beam laydowns.

Satellites have long been used to provide communication capabilities on a global scale. Typically, a satellite includes multiple uplink and downlink antennas, each of which provides communication bandwidth to a large service region using multiple spot beams. The area covered by a spot beam is commonly referred to as a cell, and color coded spot beams are assigned in a pattern called a laydown to cover the cells that make up a service region.

Spot beams are distinguished from one another by such characteristics as frequency or polarization. These characteristics allowed the spot beams in an appropriately designed laydown to operate without substantial cross channel, co-channel, or cross polarization interference. Each spot beam typically provides a fixed amount of bandwidth. Thus, prior laydowns often operated under the constraint that each cell had the same bandwidth allotment as any other cell. To provide additional bandwidth to a cell therefore meant providing additional spot beams for the cell, a potentially costly and complex proposition.

On the other hand, a laydown may include cells that simply do not need the bandwidth provided by an entire spot beam. However, prior satellites were incapable of reallocating spot beams to meet bandwidth demand, particularly on a dynamic basis. Thus, a risk exists that, after satellite launch, an increase in bandwidth demand cannot be met, and that a decrease in bandwidth demand will result in wasted power.

A need has long existed in the industry for a beam laydown that addresses the problems noted above and others previously experienced.

BRIEF SUMMARY OF THE INVENTION

A preferred embodiment of the present invention provides a method for generating a variable hop cycle beam laydown. The method includes the steps of transmitting first downlink beam energy for first cells according to a first hop cycle. The first hop cycle may be a 50-50 hop cycle that evenly shares bandwidth between two cells, for example. The method also transmits second downlink beam energy for second cells according to a second hop cycle and transmits transition downlink beam energy for transition cells according to a transition hop cycle. The second hop cycle may be, for example, a 75-25 hop cycle that provides more bandwidth for one of the second cells. The transition cells transition the first hop cycle to the second hop cycle. As an example, the transition hop cycle may be a 50-25 hop cycle with power gating 25 percent of the time.

The first, second, and transition cells may be pairs of adjacent or non-adjacent cells. However, downlink beams may hop between more than two cells. In addition, the downlink beams are generally separated by frequency and polarization, but may have other distinguishing characteristics.

The variable hop cycle beam laydown manifests itself terrestrially as first cells supported by a first hop cycle, second cells supported by a second hop cycle, and transition cells supported by a transition hop cycle. The transition hop cycle uses power gating to transition the laydown from cells operating at the first hop cycle to cells operating at the second hop cycle. To this end, the transition hop cycle power gates its downlink beam for a portion of time needed to reduce interference between nearby (e.g., adjacent) cells.

BRIEF DESCRIPTION OF THE DRAWINGS

FIG. 1 illustrates a block diagram of a power gating module.

FIG. 2 shows a detailed block diagram of a power gating module.

DETAILED DESCRIPTION OF THE INVENTION

Figure 3:
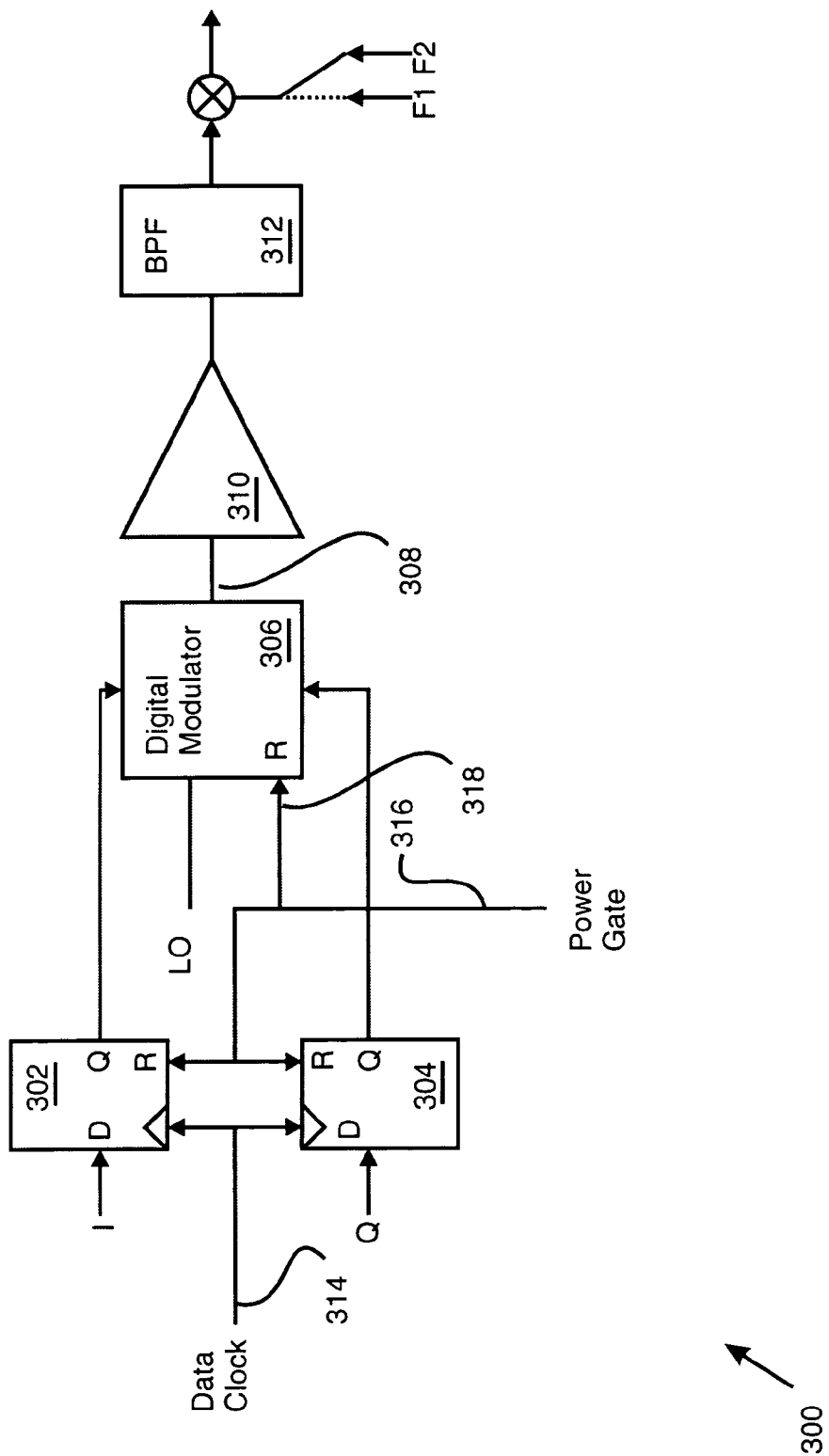
FIG. 3 shows a modulator implementation that supports power gating.

Turning now to FIG. 1, that figure shows a block diagram of a power gating module 100 that also functions, in general, to generate downlink frame waveforms. The power gating module 100 includes a controller 102 and a waveform processing chain that operates on data provided by the data source 104 (which may be a data memory organized by data queues, for example). In particular, the waveform processing chain includes a waveform generator 106, a power amplifier 108, and a switch 110. The waveform processing chain further includes a first feed path 112 and a second feed path 114.

The first feed path 112 and the second feed path 114 may, for example, connect to individual antenna feed horns to direct spot beam coverage to distinct terrestrial cells. The feed paths 112-114 may also be characterized by a polarization effect on the waveform that propagates along the feed paths 112-114, including clockwise or counter clockwise circular polarization.

The waveform generator 106 accepts baseband data from the data source 104 and creates a waveform to be transmitted (after amplification by the power amplifier 108). The switch 110 selects the particular feed path 112-114 along which the waveform propagates (and thus, in certain embodiments, the polarization and/or hop location associated with the waveform).

The controller 102 exercises beam hopping and power gating control over the waveform to be transmitted. Thus, the controller 102 may output a power gating signal that is active when selected downlink frame signals are to be power gated. More particularly, as explained below, the controller 102 may power gate entire frames based in part on the current hop location for a downlink beam and other criteria.

With regard to FIG. 2, a more specific implementation of a power gating module 200 is shown. The power gating module 200 includes a data scheduler 202, a data router 204, and a waveform processing chain including a QPSK modulator 206, an upconverter 208, and a traveling wave tube amplifier (TWTA) 210. The switch 110 is illustrated in FIG. 2 as a ferrite switch 110 that directs the waveform to be transmitted through either the first feed path 112 or the second feed path 114.

FIG. 2 also shows a control output 216 (that may used to carry, as examples, a power gating signal and a beam hopping selection signal), two frequency selection inputs 218 and 220 for the modulator 206, a feed path selection input 222, and an intermediate waveform output 224 from the modulator. Preferably, additional ferrite switches 212 and 214 in the feed paths 112, 114 provide additional signal isolation (e.g., approximately 20 db between input and output when the ferrite switch is off). In other words, the additional ferrite switches 212, 214 operate in response to the control output 216 to pass or block a waveform to be transmitted through the feed paths 112, 114. In other words, when the waveform to be transmitted is destined for the feed 112, then the ferrite switch 214 is coupled through the load 228 to ground. Similarly, when the waveform to be transmitted is destined for the feed 114, then the ferrite switch 212 is coupled through the load 226 to ground.

During operation, the power gating module 200 accepts baseband data from the router 204 (e.g., an ATM cell router), and creates a waveform to be transmitted using the waveform processing chain. The waveform processing starts by directly converting baseband I and Q data to an intermediate frequency of, for example, 750 MHz. The waveform processing then selects one of F1 (e.g., 3.175 MHz) and F2 (e.g., 3.425) and one of F3 (e.g., 16 GHz) and F4 (e.g., 17.4 GHz) to produce a waveform to be transmitted with a final center frequency at one of 18.425 GHz, 18.675 GHz, 19.825 GHz, and 20.075 GHz. The scheduler 202 monitors the propagation of data through the waveform processing chain and determines when certain frame signals should be power gated. To that end, the scheduler 202 provides a power gating signal on the control output 216 that is active when power gating is to occur.

The TWTA 210 amplifies the waveform to be transmitted, while the switch 110 determines along which feed path 112-114 (or additional feed paths) the amplified waveform will propagate. For this reason, the switch 110 includes the feed path selection input 222 responsive to information on the control output 216. Because the feed paths 112-114 are generally (though not necessarily) associated with feed horns that produce spot beams in geographically distinct terrestrial cells, the feed path selection input acts to determine the hop location of downlink frames. Thus the downlink manifests itself as a spot beam that, typically, provides bandwidth for multiple terrestrial cells by hopping between them. The hop locations below are designated Even or Odd, but are not restricted to even or odd frames. Instead Even and Odd generally designate mutually exclusive time periods.

Turning next to FIG. 3, that figure shows an implementation of the modulator 206 that supports power gating. Inphase data is supplied to the Inphase gate 302 while Quadrature data is supplied to the Quadrature gate 304. As illustrated, the Inphase and Quadrature gates 302, 304 are D flip flops with reset inputs. The Inphase and Quadrature gates 302, 304 feed a digital modulator core 306 that produces a modulated waveform on a modulator output 308. A local oscillator (LO) signal (preferably 750 MHz) provides an intermediate frequency carrier signal. The amplifier 310 boosts the modulated waveform, after which it is filtered by the bandpass filter 312. The bandpass filter 312 preferably has a passband centered at 750 MHz, for example, from 625 to 875 MHz.

A data clock 314 that preferably runs at 196.7 MHz drives the Inphase and Quadrature gates 302, 304. Note that a power gate input 316 connects to the Inphase and Quadrature gates 302, 304, as well as to the gating control input 318 of the digital modulator core 306. When an active power gating signal is present on the power gate input 316, the Inphase and Quadrature gates 302, 304 have their outputs held in a known state (e.g., both 0). Furthermore, the digital modulator core 306 outputs a signal with frequency content outside of the passband of the bandpass filter 312.

For example, the digital modulator core 306 may output a DC signal in response to the active power gating signal. As a result, the bandpass filter eliminates the DC signal. A power gated signal results.

Returning to FIG. 2, the upconverter 208 (e.g., a 20 GHz mixer) ordinarily outputs a fully upconverted signal for amplification and transmission. However, the absence of energy in the power gated signal causes the upconverter to produce substantially no signal at its output during power gating. As a result, the TWTA 210 does not expend amplification energy, and substantially no downlink energy is present in the downlink beam while the power gating signal is active.

Figure 4:
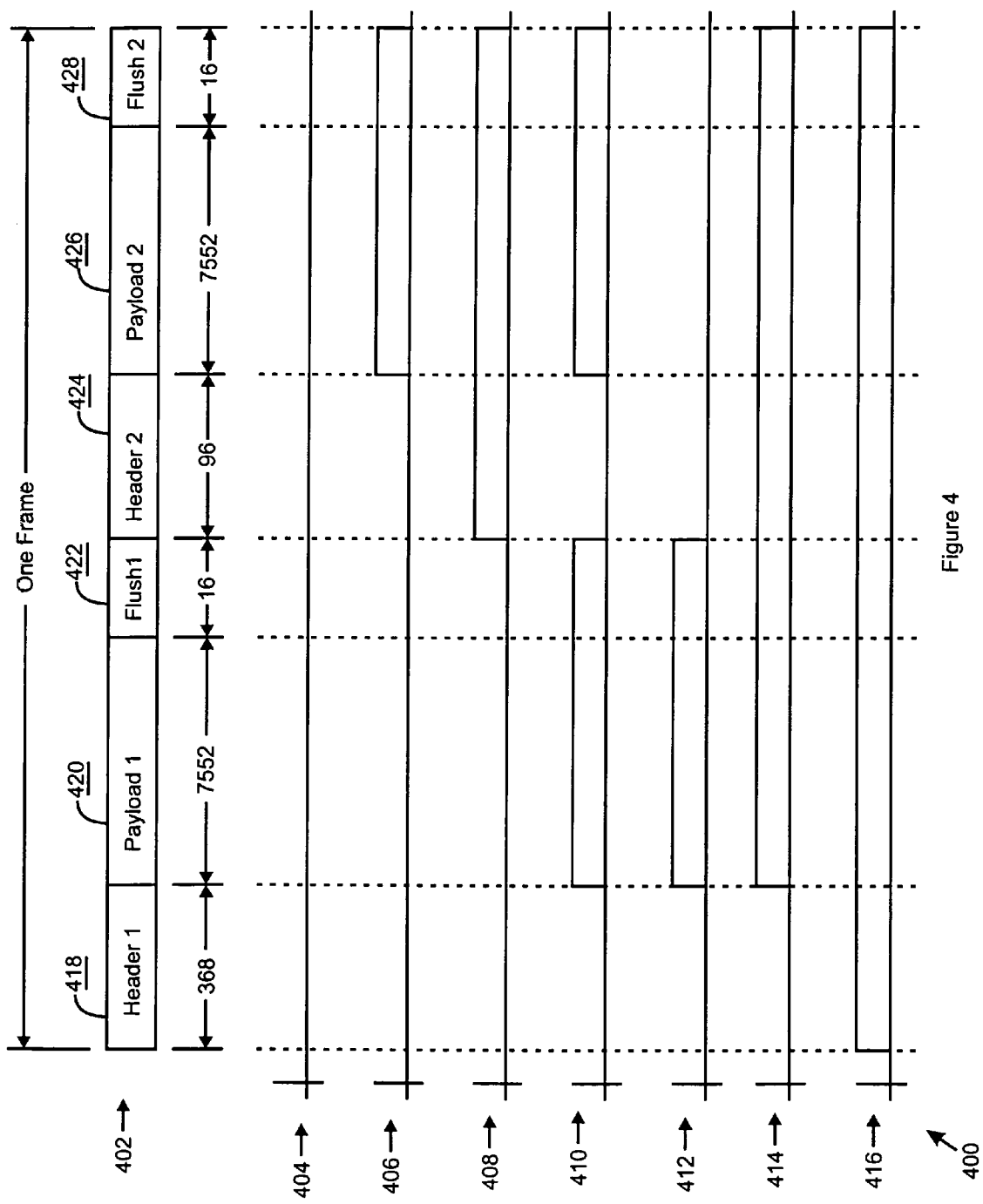
FIG. 4 shows a multiple payload frame signal with exemplary power gating control signals.

Turning next to FIG. 4, that figure presents a timing diagram 400 that illustrates a multiple payload frame signal 402 and power gating signals 404, 406, 408, 410, 412, 414, 416 (assumed active when high). As an example, the frame signal 402 may include a 368-symbol first header signal 418, a 7552-symbol first payload signal 420, a first 16-symbol flush signal 422, a 96-symbol second header signal 424, a 7552-symbol second payload signal 426, and a second 16-symbol flush signal 428. In general, however, the frame signal 402 may include N headers and N payloads independently subject to power gating.

The power gating signal 404 never goes active during the frame signal 402. Thus, none of the frame signals 418-428 are power gated. As a result, both first and second header signals 418, 424, both first and second payload signals 420, 426, and both first and second flush signals 422, 428 are delivered to the ground. In contrast note that the power gating signal 416 is active across the entire frame signal 402. Thus, substantially no energy is provided in the downlink beam over the time during which the frame signal 402 would be transmitted.

On the other hand, the power gating signal 406 goes active during the second payload signal 426 and the second flush signal 428. Thus, the frame signal 402 continues to bear important overhead information in the first and second header signals 418, 424. The overhead information may include, for example, synchronization bits, beam hopping location identifiers, frame coding identifiers, frame counts, and the like.

The overhead information may further include power gating bit patterns that indicate to a ground receiver which frame signals are power gated. As an example, the first header signal 418 or second header signal 424 may include a frame type field that carries repetitions of the bit pattern 10100101 to indicate power gating of the first payload signal 420 or second payload signal 426, or repetitions of the bit pattern 11110000 to indicate power gating of the entire frame signal 402. In particular, bit patterns may be assigned to identify any combination of header, payload, and flush signal power gating. Note also that a ground receiver may deactivate its own receivers in response to the bit patterns, in order to save power during power gated sections of the frame signal.

Still with reference to FIG. 4, the power gating signal 410 results in power gating of the first and second payload and flush signals 420, 422, 426, 428. Similarly, the power gating signal 412 results in power gating of the first payload signal 420 and the first flush signal 422.

Because the multiple payload frame signal 402 includes multiple headers, each preferably bearing synchronization information, additional power gating options are available. Thus, for example, the power gating signal 408 power gates the second header signal 424, second payload signal 426, and the second flush signal 428. Synchronization is nevertheless provided by the first header signal 418. Similarly, the power gating signal 414 power gates all the frame signals except for the first header signal 418.

The scheduler 202 may include logic to assert the power gating signal under many scenarios. For example, when the satellite moves into eclipse and less power is available, the scheduler 202 may power gate every second complete frame, every second payload, or any combination of frame signals to achieve a desired power reduction. As another example, the scheduler 202 may activate the power gating signal in response to a statistical multiplexing estimate of downlink beam utilization. As an example, if the downlink beam is estimated to be 90% utilized during a certain time period, then the scheduler 202 may power gate up to 10% of the frames or payloads. Such estimates may be generated terrestrially and uplinked to the satellite or generated onboard.

As another example, the scheduler 202 may determine when to activate power gating based on the current terrestrial cell hop location of the downlink beam. Thus, the scheduler 202 may power gate the second payload signal 426 if the bandwidth requirements of the current terrestrial cell are met by the first payload signal 420 alone. As yet another example, the scheduler 202 may power gate based on data queues present in the router 204. For example, a data queue from which ATM data cells are extracted to fill the second payload signal 426 may consistently have too few cells to completely fill the second payload signal 426. In response, the scheduler 202 may power gate the second payload signal 426 periodically in order to maintain the data queue approximately at a preselected occupancy level, on the average.

Figure 5:
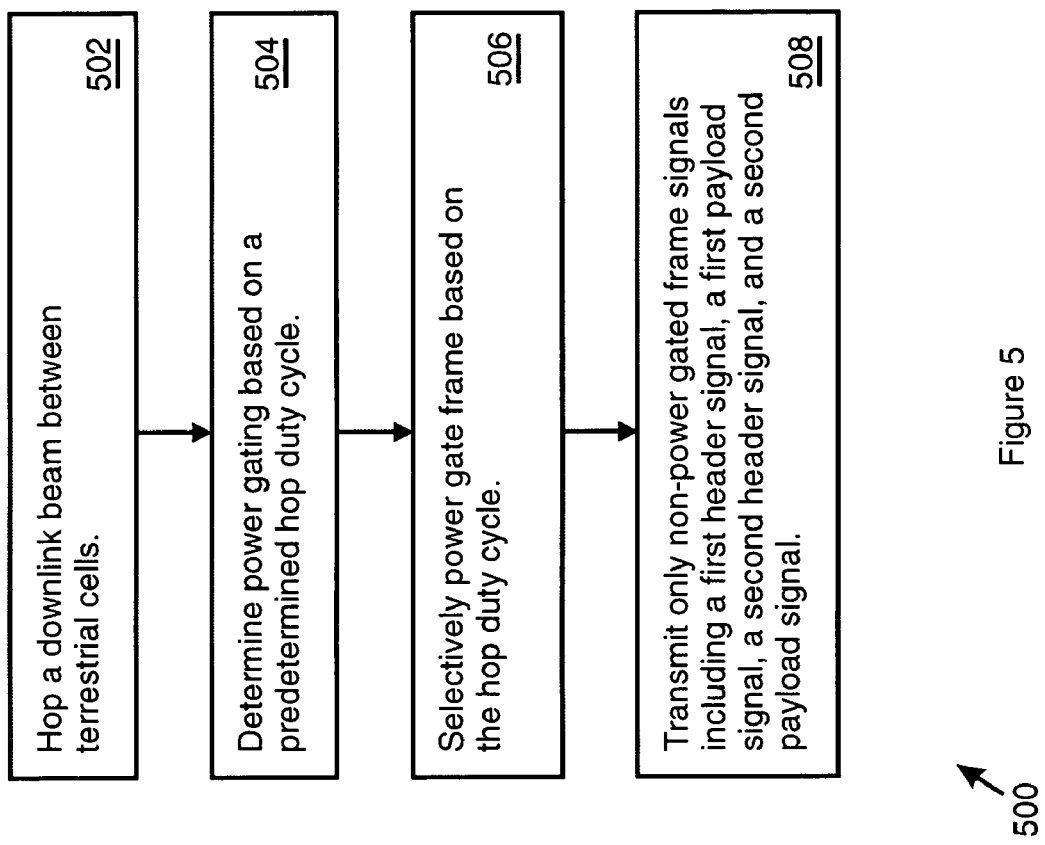
FIG. 5 illustrates operational steps that occur before and after a beam hopping multiple payload frame signal is power gated.

Turning next to FIG. 5, that figure shows a flow diagram 500 of the operational steps that occur before and after power gating. The operational steps include hopping 502 a downlink beam between at least two terrestrial cells. At step 504, power gating is determined based on the beam hoping duty cycle. As an example, power gating may be activated to provide a power gated, variable duty cycle beam laydown, discussed below with respect to FIGS. 6 and 7.

Continuing at step 506, entire frames may be power gated. Thus, at step 508, a frame signal is transmitted only for non-power gated frames containing at least one header signal, payload signal, and flush signal while substantially no energy in the downlink beam is transmitted for power gated frames.

Figure 6:
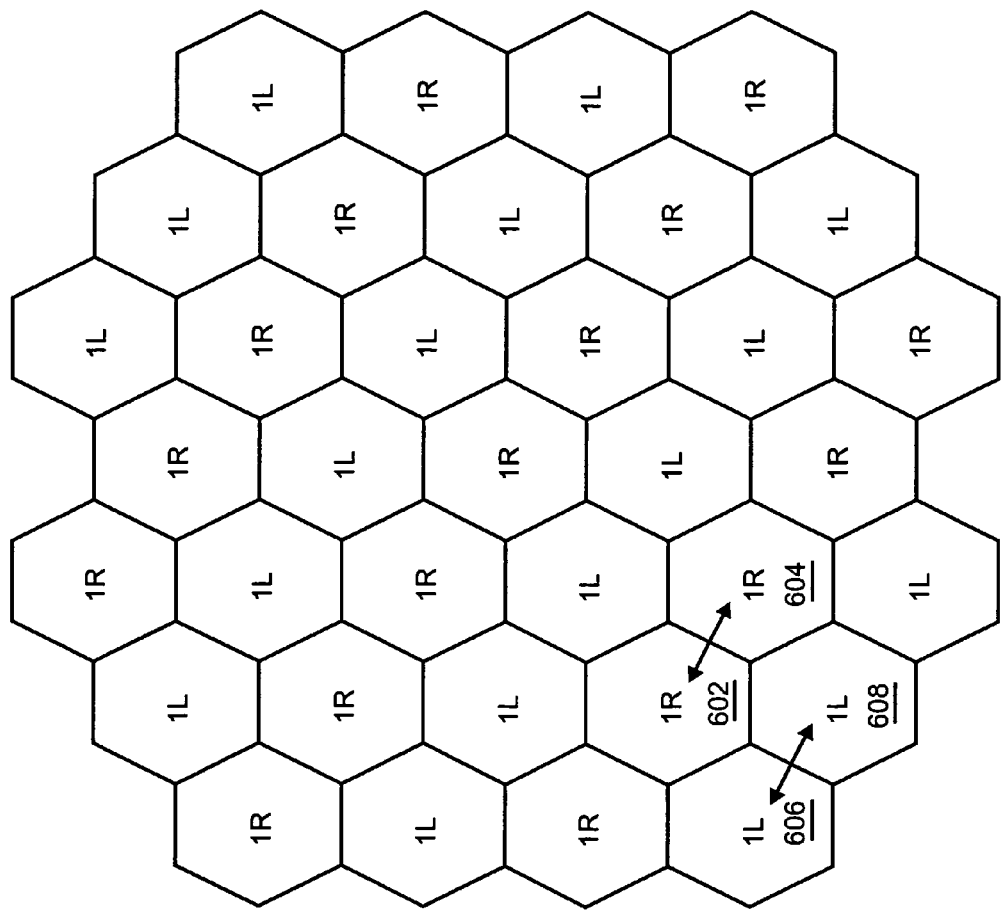
FIG. 6 shows a beam laydown using beams of a first frequency and one of two polarizations.

Turning next to FIG. 6, that figure illustrates a beam laydown 600. The beam laydown 600 uses beams of a first frequency and two different polarizations (1R and 1L). For example, 1R beams cover cells 602, 604, while 1L beams cover cells 606, 608. It is generally undesirable to have two adjacent, same-color (e.g., 1L) cells receiving energy simultaneously because high levels of interference between adjacent cells would result, and thus pairs of adjacent cells are assumed to be hopped on a 50-50 hop cycle. With respect to cells 606, 608, for example, spot beam energy is provided in cell 606 for half of a predetermined time period, while spot beam energy is provided in cell 608 for the other half. One of the many ways in which a 50-50 hop cycle may be implemented is to transmit a first frame to cell 606, hop to cell 608, transmit a second frame to cell 608, the hop back to cell 606. The hops need not be between adjacent cells.

Figure 7:
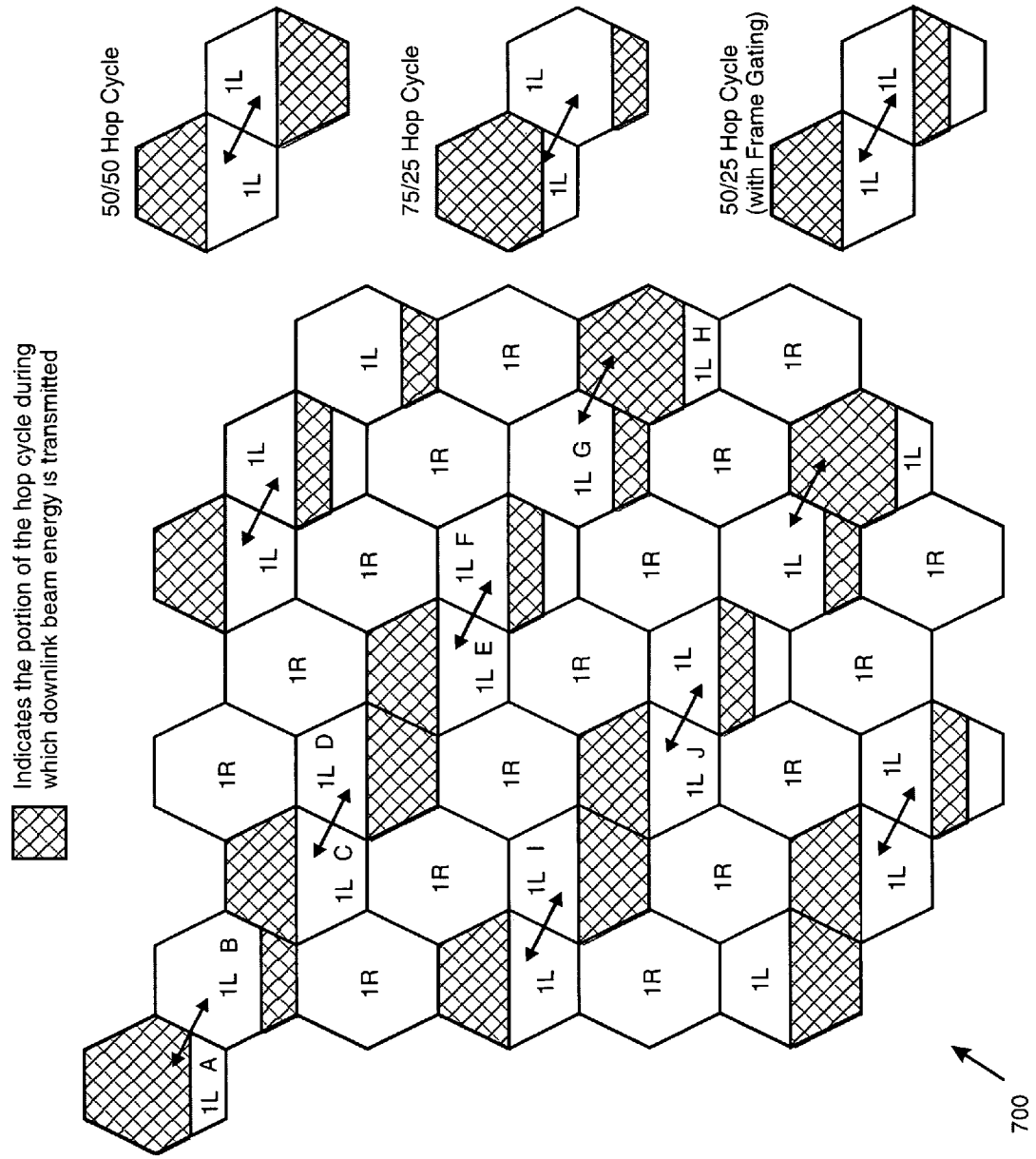
FIG. 7 depicts a power gated, variable hop cycle beam laydown.

While a 50-50 hop cycle may be appropriate for many cells that have equal bandwidth needs, certain cells may need additional bandwidth. Turning next to FIG. 7, that figure shows a variable hop cycle beam laydown 700 (specifically implemented for the 1L beams). The beam laydown 700 uses power gating to allow different hop cycles between cells, eight of which are identified in FIG. 7 as cells A-H. For each cell, the portion of a hop cycle during which downlink beam energy is transmitted to that cell is indicated in FIG. 7 by cross-hatching.

Cells A and B, C and D, E and F, and G and H are hop pairs. Cells A and H benefit from increased bandwidth (and may correspond, for example, to large population centers such as Los Angeles and Chicago). To that end, cells A and B are on a 75-25 hop cycle, as are cells G and H. Cells C and D are on a default 50-50 hop cycle. In order to transition from the 50-50 hop cycle of cells C and D to the 75-25 hop cycle of cells G and H, the transition cells E and F hop at a 50-25 transition hop cycle with power gating to prevent any adjacent cells from having 1L downlink beam energy at the same time.

The transition cells E and F (because of the 50-25 transition hop cycle) are interfering minimally with the adjacent cells. Minimization of interference may be gauged by the separation of cells by one or more beam color components including frequency and polarization. Note also that hop pairs need not be adjacent. For example, referring again to FIG. 7, cells C and I may be hop pairs, and cells D and J may be hop pairs.

In other words, cell E has downlink beam energy half the time, cell F has downlink beam energy 25 percent of the time, and the remaining time the downlink frames are power gated. One way in which this may be implemented is shown in the hop table below (Table 1). In Table 1, a 'T' indicates transmission of downlink beam energy for a cell, 0 indicates a time during which the beam has been hopped to a different cell, and G indicates that all or part of a frame has been power gated.

TABLE 1

|        | Time 1 | Time 2 | Time 3 | Time 4 | Time 5 | Time 6 | Time 7 | Time 8 |
|--------|--------|--------|--------|--------|--------|--------|--------|--------|
| Cell A | T      | T      | T      | 0      | T      | T      | T      | 0      |
| Cell B | 0      | 0      | 0      | T      | 0      | 0      | 0      | T      |
| Cell C | T      | 0      | T      | 0      | T      | 0      | T      | 0      |
| Cell D | 0      | T      | 0      | T      | 0      | T      | 0      | T      |
| Cell E | T      | 0      | T      | 0      | T      | 0      | T      | 0      |
| Cell F | 0      | T      | 0      | G      | 0      | T      | 0      | G      |
| Cell G | 0      | 0      | 0      | T      | 0      | 0      | 0      | T      |
| Cell H | T      | T      | T      | 0      | T      | T      | T      | 0      |

Table 1 specifies that cell A (e.g., covering Los Angeles) receives energy at times 1, 2, and 3. Each time may represent a single frame or a set of N frames, as examples. In other words, over a time period of 4 frames, cell A receives downlink beam energy 75 percent of the time period (in order to deliver three frames to cell A). Cell B receives energy at time 4, or 25 percent of the time period (in order to deliver a single frame to Cell B). Similarly, cell C receives energy at times 1 and 3 and cell D receives energy at times 2 and 4.

Cell G receives energy at time 4 while cell H (e.g., Chicago) receives energy at times 1, 2, and 3. The transitions cells E and F are configured, like the other cells, to avoid simultaneous transmission of energy to adjacent cells. One way in which this may be done is to deliver energy to cell E during times 1 and 3, to deliver energy to cell F during time 2, and power gate the downlink frame in cell F during time 4 (the remaining time period). Thus, although a fraction of the downlink bandwidth is power gated in cell F, a transition is made from a 50-50 hop cycle to a 75-25 hop cycle to support the bandwidth demands of cell H, while keeping interference between cells to a minimum.

The entries in the hop table may be supported by a memory in the scheduler 202. In particular, before each frame is transmitted, the scheduler 202 retrieves a frame header from the downlink scheduling table. The frame header preferably specifies a 3-bit beam A type and a 3-bit beam B type, where beam A refers to a first hop location in a hop pair (e.g., cell A) and beam B refers to a second hop location in the hop pair (e.g., cell B). Table 2 illustrates exemplary beam type bit pattern definitions.

TABLE 2

| Bit pattern | Beam type |
|---|---|
| 000 | power gate |
| 001 | frame gate |
| 010 | disable beam |
| 011 | heavy coding frame |
| 110 | light coding frame |

Thus, a 000 beam type indicates that a payload in a frame should be power gated, a 001 beam type indicates that the entire frame should be power gated, and a 010 beam type indicates that the beam is disabled. Because energy is not provided in hop pairs simultaneously, either beam A or beam B is always disabled under ordinary circumstances.

A beam may hop between more than two cells. To that end, the frame header may be extended to include beam type definitions for additional beams.

Thus, the present invention provides selective power gating of frame signals in a beam hopped multiple payload downlink frame. The power gating may be used to implement variable hop cycles in a beam laydown to deliver bandwidth where it is most needed. Changes in bandwidth demand may be met on a dynamic basis even after the satellite is launched.

Note also that the hop cycles are not restricted to 50-50 or 25-75. Rather, because frames may be sent to selected hop locations on a frame by frame basis, the hop cycles may be set to any desired ratio by hopping frames appropriately.

While the invention has been described with reference to a preferred embodiment, those skilled in the art will understand that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A variable beam hop cycle beam laydown comprising:
    first cells supported by a first beam hop cycle;
    second cells supported by a second beam hop cycle different from the first beam hop cycle; and
    transition cells supported by a transition beam hop cycle for transitioning between the first beam hop cycle and the second beam hop cycle;
    wherein each beam hop cycle defines how the downlink energy of one beam is time-shared between at least two cells and wherein each of the hop cycles defines a schedule for transmitting beam energy to at least two cells in a sequential and non-simultaneous manner;
    wherein the first cells comprise a first beam-hopped pair of cells, the second cells comprise a second beam-hopped pair of cells, and the transition cells comprise a third beam-hopped pair of cells;
    wherein the first beam hop cycle is a 50-50 beam hop cycle wherein beam energy is directed to two cells sequentially on a 50-50 duty cycle basis; and
    wherein the second beam hop cycle is a 75-25 beam hop cycle in which beam energy is directed to two cells sequentially on a 75-25 duty cycle basis, and wherein the transition beam hop cycle is a 50-25 beam hop cycle in which beam energy is directed to two cells sequentially on a 50-25 duty cycle basis and is powered off for a remaining 25% of the duty cycle.

2. The laydown of claim 1, wherein the 50-25 beam hop cycle directs downlink beam energy to a first transition cell 50 percent of a time period, downlink beam energy to a second transition cell 25 percent of the time period, and a power gated downlink beam 25 percent of the time period.

3. Apparatus for generating a variable hop cycle beam laydown, the apparatus comprising:
    a waveform generator producing a first downlink beam, second downlink beam, and a transition downlink beam;
    at least one switch directing the first downlink beam between first feed paths to first cells, directing the second downlink beam between second feed paths to second cells, and directing the transition downlink beam between third feed paths to transition cells;
    at least one feed path selection input coupled to the at least one switch; and a memory for storing downlink beam type definitions that direct the feed path selection input to control the switch according to a first beam hop cycle, a second beam hop cycle different from the first beam hop cycle, and a transition beam hop cycle;
    wherein each beam hop cycle defines how one downlink beam is time-shared between at least two cells and wherein operation of the at least one switch ensures that each downlink beam is directed to at least two cells in a sequential and non-simultaneous manner;
    wherein the first beam hop cycle directs additional bandwidth to one of the first cells to meet bandwidth need;
    wherein the first beam hop cycle is a 75-25 beam hop cycle in which beam energy is divided temporally between two cells on a 75-25 duty cycle basis; and
    wherein the second beam hop cycle is a 50-50 beam hop cycle in which beam energy is divided temporally between two cells on a 50-50 duty cycle basis, and wherein the transition beam hop cycle is a 50-25 beam hop cycle in which beam energy is directed to two cells sequentially on a 50-25 duty cycle basis and is powered off for a remaining 25% of the duty cycle.

4. A system for generating a variable hop cycle beam laydown comprising:
    first cells supported by a first beam hop cycle associated with a first downlink beam;
    second cells supported by a second beam hop cycle associated with a second downlink beam, the second beam hop cycle being different than the first beam hop cycle; and
    transition cells supported by a transition beam hop cycle, wherein said transition beam hop cycle comprises transition downlink beam energy transmitted to a first transition cell a first percent of a time period, the transition downlink beam energy transmitted to a second transition cell a second percent of the time period, and a power gated downlink beam associated with at least one of the first transition cell and the second transition cell for a remaining percent of the time period, such that the first downlink beam is provided to one of the first cells that is adjacent to the first transition cell during one of the second percent of the time period and the remaining percent of the time period, and such that the second downlink beam is provided to one of the second cells that is adjacent to the second transition cell during one of the first percent of the time period and the remaining percent of the time period.

5. Apparatus for generating a variable hop cycle beam laydown, the apparatus comprising:
   a waveform generator producing a first downlink beam, second downlink beam, and a transition downlink beam;
   at least one switch directing the first downlink beam between first feed paths to first cells, directing the second downlink beam between second feed paths to second cells, and directing the transition downlink beam between third feed paths to transition cells;
   at least one feed path selection input coupled to the at least one switch;
   a memory for storing downlink beam type definitions that direct the feed path selection input to control the switch according to a first beam hop cycle, a second beam hop cycle different than the first beam hop cycle, and a transition beam hop cycle,
   wherein the transition beam hop cycle specifies transmission of downlink beam energy of the transition downlink beam to a first transition cell a first percent of the time period, specifies the downlink beam energy of the transition downlink beam to a second transition cell a second percent of the time period, and specifies a power gated downlink transition beam associated with at least one of the first transition cell and the second transition cell a remaining percent of the time period, such that the first downlink beam is provided to one of the first cells that is adjacent to the first transition cell during one of the second percent of the time period and the remaining percent of the time period, and such that the second downlink beam is provided to one of the second cells that is adjacent to the second transition cell during one of the first percent of the time period and the remaining percent of the time period; and
   a power gating circuit coupled to the waveform generator for gating power in the transition downlink beam.

6. A method for providing a variable beam hop cycle beam laydown, the method comprising:
   transmitting first downlink beam energy for first cells according to a first beam hop cycle;
   transmitting second downlink beam energy for second cells according to a second beam hop cycle different from the first beam hop cycle; and
   transmitting transition downlink beam energy for transition cells according to a transition beam hop cycle, the transition beam hop cycle comprises transition downlink beam energy transmitted to a first transition cell a first percent of a time period, the transition downlink beam energy transmitted to a second transition cell a second percent of the time period, and a power gated downlink beam associated with at least one of the first transition cell and the second transition cell for a remaining percent of the time period;
   wherein each of the first beam hop cycle, the second beam hop cycle, and the transition beam hop cycle define how the respective downlink beam energy of a given beam is time shared between at least two cells of the respective first cells, second cells, and transition cells, such that a first downlink beam is provided to one of the first cells that is adjacent to a first transition cell during one of the second percent of the time period and the remaining percent of the time period, and such that the second downlink beam is provided to one of the second cells that is adjacent to the second transition cell during one of the first percent of the time period and the remaining percent of the time period.

* * * * *